United States Patent
Esposito et al.

(10) Patent No.: US 7,249,470 B2
(45) Date of Patent: Jul. 31, 2007

(54) METHOD OF CONTROLLING LIQUID PRODUCTION UTILIZING AN EXPERT SYSTEM CONTROLLER

(75) Inventors: William Randy Esposito, Amherst, NY (US); Lawrence Megan, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 9 days.

(21) Appl. No.: 11/100,428

(22) Filed: Apr. 7, 2005

(65) Prior Publication Data

US 2006/0225462 A1    Oct. 12, 2006

(51) Int. Cl.
*F25J 3/00* (2006.01)
*G05B 21/00* (2006.01)
*G05B 13/02* (2006.01)
*G06F 9/44* (2006.01)
*G06E 1/00* (2006.01)

(52) U.S. Cl. .................... 62/656; 62/657; 700/270; 700/273; 706/23; 706/900; 706/52

(58) Field of Classification Search ............ 62/656, 62/657; 700/270, 273; 706/23, 900, 52; 705/22, 412; 702/32
See application file for complete search history.

(56) References Cited

U.S. PATENT DOCUMENTS

| | | | | |
|---|---|---|---|---|
| 5,025,499 | A * | 6/1991 | Inoue et al. | 706/62 |
| 5,148,370 | A | 9/1992 | Litt et al. | 364/468 |
| 5,819,232 | A | 10/1998 | Shipman | 705/8 |
| 6,055,524 | A * | 4/2000 | Cheng | 706/23 |
| 6,647,745 | B1 * | 11/2003 | Belanger | 62/656 |
| 6,957,153 | B2 * | 10/2005 | Esposito, Jr. | 702/32 |
| 7,092,893 | B2 * | 8/2006 | Megan et al. | 705/7 |

* cited by examiner

*Primary Examiner*—William C. Doerrler
(74) *Attorney, Agent, or Firm*—David M. Rosenblum

(57) ABSTRACT

Method for controlling the production of one or more liquid products produced by one or more plants, that can be an air separation plant, that has a liquid storage capacity and that consumes electrical power. Linguistic values related to current liquid inventory, a rate of change of liquid inventory, projected demand requirements and projected unit power costs are inputted into a expert system controller having one or more rule sets that apply such input linguistic values to produce output linguistic values that are converted back to an output numerical value of a forecasted differential production rate to be applied during a forecast period. The output numerical value of differential production is added to the current production rate of the plants to obtain a new production rate which is applied during the forecast period.

11 Claims, 3 Drawing Sheets

US 7,249,470 B2

METHOD OF CONTROLLING LIQUID PRODUCTION UTILIZING AN EXPERT SYSTEM CONTROLLER

FIELD OF THE INVENTION

The present invention relates to a method of controlling the production of one or more liquid products produced by one or more plants to meet a pre-specified liquid demand in which electrical power is consumed in the production of the liquid and the liquid is obtained for distribution from active production of the liquid and/or from a liquid storage capacity. More particularly, the present invention relates to such a method of control in which the control is provided by an expert system controller that functions on the basis of fuzzy logic.

BACKGROUND OF THE INVENTION

There exist many automated production schemes for controlling the production of liquid products in which electrical power is consumed by a production facility in the production of the liquid products.

An example of such a production facility is a cryogenic air separation plant in which air is compressed and then cooled to a temperature level that is at or near dew point. The compressed and cooled air is then rectified in one or more distillation columns that are commonly designed to fractionate the air into a nitrogen rich product, oxygen and nitrogen rich products or oxygen, nitrogen and argon rich products.

In any air separation plant, a large proportion of the electrical power is consumed in powering the main air compressor used in compressing the air. As such, the electrical power constitutes the major cost of production. In air separation plants that are designed to produce a liquid oxygen product, the liquid oxygen is a value added product in that oxygen constitutes roughly 20 percent of the air to be fractionated. In an air separation plant that is designed to produce a liquid nitrogen product, a nitrogen liquefier is employed that also consumes electrical power.

Air separation plants are provided with a liquid storage capacity that consists of one or more liquid storage tanks that are capable of storing the liquid products produced by the plant. Liquid products to be distributed to meet customer demand may be produced from active production of the facility and/or from stored liquid. Plant operators therefore must decide on how much liquid must be produced by the plant itself to meet such demand as opposed to the amount of liquid to be drawn from storage.

Complicating the decision is that the electrical power costs are a variable factor that can change with the time of day. As indicated above, the cost of electrical power can be the major cost in the production of liquid by a plant and this is particularly true in air separation plants. Additionally, many chemical plants that are designed to produce liquid products, air separation plants in particular, cannot be controlled so that changes in active production are instantaneous. In case of air separation plants, production rates cannot be rapidly swung without changing product purity. Hence, if liquid product is being accumulated or depleted from storage at a particular rate of change and based upon a previous level of demand, any control input into the plant will not be instantaneous and in any case adds a degree of freedom to the problem that makes a decision on the level of plant liquid production particularly difficult.

Hence, a forecast by plant personnel on how much liquid product or products to be produced by a plant is a particularly difficult problem in which often plant production remains stable with production being ramped up and down to meet unusual, high and low demands. This leads to inefficient production on a monetary basis that often results in a plant not capturing its potential profitability.

As will be discussed, the present invention provides a method of controlling a plant or plants that produce one or more liquid products by an expert system controller of control to meet projected customer demand that simultaneously considers projected unit power costs, the amount of liquid within the plant liquid storage capacity and the rate of change within the plant liquid storage capacity. This allows the plant to be more efficiently operated on an economic basis.

SUMMARY OF THE INVENTION

The present invention provides a method of controlling the production of at least one liquid product produced by at least one plant over a forecast time interval. The at least one plant has a liquid storage capacity and consumes electrical power in the production of the at least one liquid product.

In accordance with the method, continually, upon the elapse of a calculation time interval equal to the forecast time interval, a rate of change of liquid inventory of the at least one liquid product contained with the liquid storage capacity is calculated over a past time interval equal to the calculation time interval and ending upon the calculation of the rate of change of liquid inventory. Input linguistic vales referable to current liquid inventory, the rate of change of liquid inventory, a current production rate of the at least one liquid product by the at least one plant, projected demand requirements for the at least one liquid product and projected unit power costs for the electrical power over the forecast time interval are all inputted into an expert system controller employing fuzzy logic. The fuzzy logic applies such input linguistic values to at least one rule set to obtain output linguistic values and to convert the output linguistic values into an output numerical value of a forecasted differential production rate for the at least one liquid product.

The at least one rule set and the input linguistic values are defined such that the forecasted differential production rate tends to decrease as the rate of change and/or the liquid inventory and/or the projected unit power costs increase and the differential production rate tends to increase as the projected demand requirements increase and vice-versa.

The output numerical value of the forecasted differential production rate is added to the current production rate to obtain the new production rate. The plant is controlled to produce the at least one liquid product at the new production rate during the forecast time interval.

As can be appreciated from the above discussion, the level of control exerted in the present invention allows more or less liquid to be produced by the plant or plants. As the level of production falls, more liquid will be supplied from the liquid storage capacity. Projected demand requirements are met both with plant production and prior plant production in the form of stored liquid. Hence, what is captured by the present invention is a level of control that intelligently modulates production based not only on present demand but also past production in the form of stored liquid or increasing levels of amounts of liquid being stored. In this manner alone, power costs can be reduced because there will tend to be lower production of liquid at higher amounts of stored liquid and rates of change. Additionally, electrical power costs over at least the long term are also reduced in that assuming a low level of projected unit power cost, more liquid will tend to be produced with any excess going to liquid storage for potentially future use when power costs are higher.

In any embodiment of the present invention, the at least one plant can be controlled by an open-loop response, namely, the numerical values produced by expert system controller serve as a manual input by the operator. Additionally, a closed-loop response is possible in which calculated new production rates are automatically fed as an input to a plant controller of the at least one plant.

Preferably, the at least one rule set is composed of three rule sets. The input numerical values for the current liquid inventory and the rate of change can be converted into a first set of input linguistic values. The input numerical values for the projected demand requirements and the projected unit power costs can be converted into a second of the input linguistic values and a third of the input linguistic values, respectively. The first set of input linguistic values are applied to the first of the three rule sets to obtain an intermediate linguistic value. The second of the input linguistic values and the first intermediate linguistic value obtained from the first rule set can be applied to the second of the three rule sets to obtain a second intermediate linguistic value. Lastly, the third of the linguistic values and the second intermediate linguistic value can be applied to the third of the three sets to obtain the output linguistic value.

In any embodiment of the present invention, a bounds check can be performed on the new production rate to ascertain whether the new production rate is between upper and lower bounds of production of the at least one plant. The at least one plant can then be controlled to produce that at least one liquid product at the new production rate during the forecast period when said new production rate is between the upper and lower bounds of production. When the new production rate is below the lower of the bounds, the at least one plant is controlled to produce that at least one liquid product at the lower of the bounds and when the new production rate is above the upper of the bounds, the at least one plant is controlled to produce the at least one liquid product at the upper of the bounds.

The input of the input linguistic values into the expert system controller can be accomplished, internally in the expert system controller, by inputting input data of numerical values related to the current liquid inventory, the rate of change, the projected demand requirements and the unit power costs into the expert system controller. In such case, the expert system controller converts the input numerical values into the input linguistic values.

The foregoing method of control can be applied to a cryogenic air separation plant. In such a plant, the forecasted demand requirements for the at least one liquid product can be based upon customer demand patterns and any customer request for the at least one liquid product occurring prior to the implementation of the new production rate. In this manner, it is not only actual demand that can be considered but also projected demand on a historical basis. Preferably, the input numerical values can be converted into input linguistic values and the output linguistic values can be converted to the forecasted differential production rate by input and output fuzzy sets that are of triangular configuration. The final linguistic value can be converted into the output numerical value by a center of area method.

BRIEF DESCRIPTION OF THE DRAWINGS

While the specification concludes with claims distinctly pointing out the subject matter that Applicants regard as their invention, it is believed that the present invention will be better understood when taken in connection with the accompanying drawings in which:

DETAILED DESCRIPTION

Figure 1:
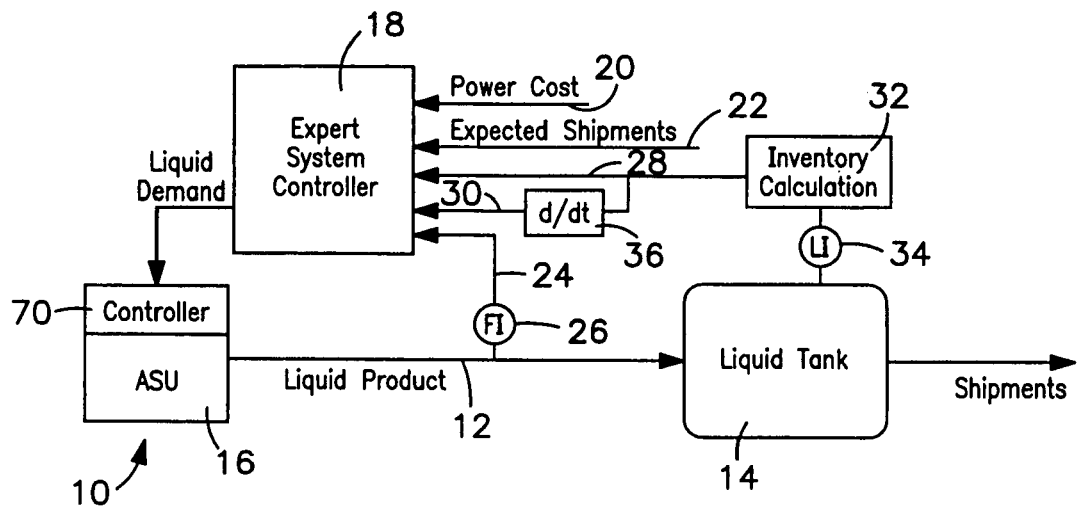
FIG. 1 is a schematic illustration of an expert system controller applied to the control of an air separation plant that produces one liquid product.

With reference to FIG. 1, a method of the present invention is applied to control of an air separation plant 10. As indicated above, this is for illustrative purposes. A method of the present invention can be applied in any type of plant that produces at least one liquid product as indicated by liquid stream 12 by the consumption of electrical power and that has a liquid storage capacity provided by liquid tank 14.

Air separation plant 10 has an air separation unit 16 that can be of any design. For example, air separation unit 16 could be a double column arrangement in which higher and lower pressure columns, that is columns that operate at higher and lower pressures, are connected to one another in a heat transfer relationship by a condenser-reboiler. Air is filtered, compressed by a main air compressor, that consumes most of the electrical power requirements, and is cooled to at or near its dew point. The compressed air introduced into the base of a higher pressure column to initiate the formation of an ascending vapor phase that becomes evermore rich in nitrogen and lean in oxygen. The nitrogen overhead in the higher pressure column is condensed in the condenser reboiler to initiate the formation of a descending liquid phase that becomes evermore rich in oxygen as it descends. The nitrogen overhead is then further refined in the lower pressure column to produce liquid oxygen that may be taken as a product and that condenses the tower overhead in the higher pressure column. Liquid-vapor contact within such columns is provided by trays or packing.

In accordance with the present invention an expert system controller 18 is used to determine the production rate of liquid of air separation plant 10 for a forecast time interval. The liquid can be liquid oxygen, as described above. Additionally though, liquid nitrogen could be produced by a nitrogen liquefier. Expert system controller 18 is known in the art as an expert system controller that functions on the basis of fuzzy logic. Expert system controller 18 is in practice a computer program that is loaded into a personal computer that preferably over a local area network ties in with a distributed control system for plant 10. An example of this program is the Fuzzy Logic Toolbox for MATLAB that can be obtained from The MathWorks, Inc. (3 Apple Hill Drive, Natick, Mass. 01760-2098).

Numerical values of a projected unit power cost 20 and projected demand requirements 22 serve as an input to expert system controller 18. Additionally, the current rate of production of the liquid product produced by plant 10 is also an input 24 into expert system controller 18. In this regard, the current production is a flow rate of liquid stream 10 that is converted into an electrical signal referable to the flow rate by a flow meter 26. Additional inputs are the liquid inventory of the liquid product as an input 28 and the rate of change of liquid inventory liquid as an input 30. The inventory calculation in block 32 is based upon a level sensed by level transducer 34 which is preferably a set of differential pressure transducers as known in the art. The rate of change of liquid inventory is computed in box 36 labeled "d/dt" in which a previous liquid inventory, that was determined of a time previous to execution of controller 18 in an amount equal to the calculation of time interval, is subtracted from the current liquid inventory (input 28) and divided by the time of the calculation interval.

Input 28 and input 30 can be data that is automatically read upon execution of expert system controller 18. Preferably, however, data referable to all of inputs can be obtained from a process historian connected to the distributed control system or a process historian contained in expert system controller 18 to store past values of liquid inventory in its own memory space.

The projected unit power cost input 20 is an expected unit power cost which can be obtained from an electrical utility, other data or forecast. The projected demand requirements 20 can be based on customer demand patterns for the liquid as well as instantaneous orders from customers that must be fulfilled within the forecast time interval. Additionally, telemetry of liquid storage tanks at customer sites can also be used to determine such demands. Typically, projected liquid demand can be computed from customer demand patterns and any requests for liquid.

Although as indicated above, the data input to expert system controller 18 may be automatic, such data input could be manual as well. The forecast period and therefore the calculation period can preferably be anywhere from 1 to 24 hours and is most preferably the length of a shift which can be approximately 12 hours.

Figure 2:
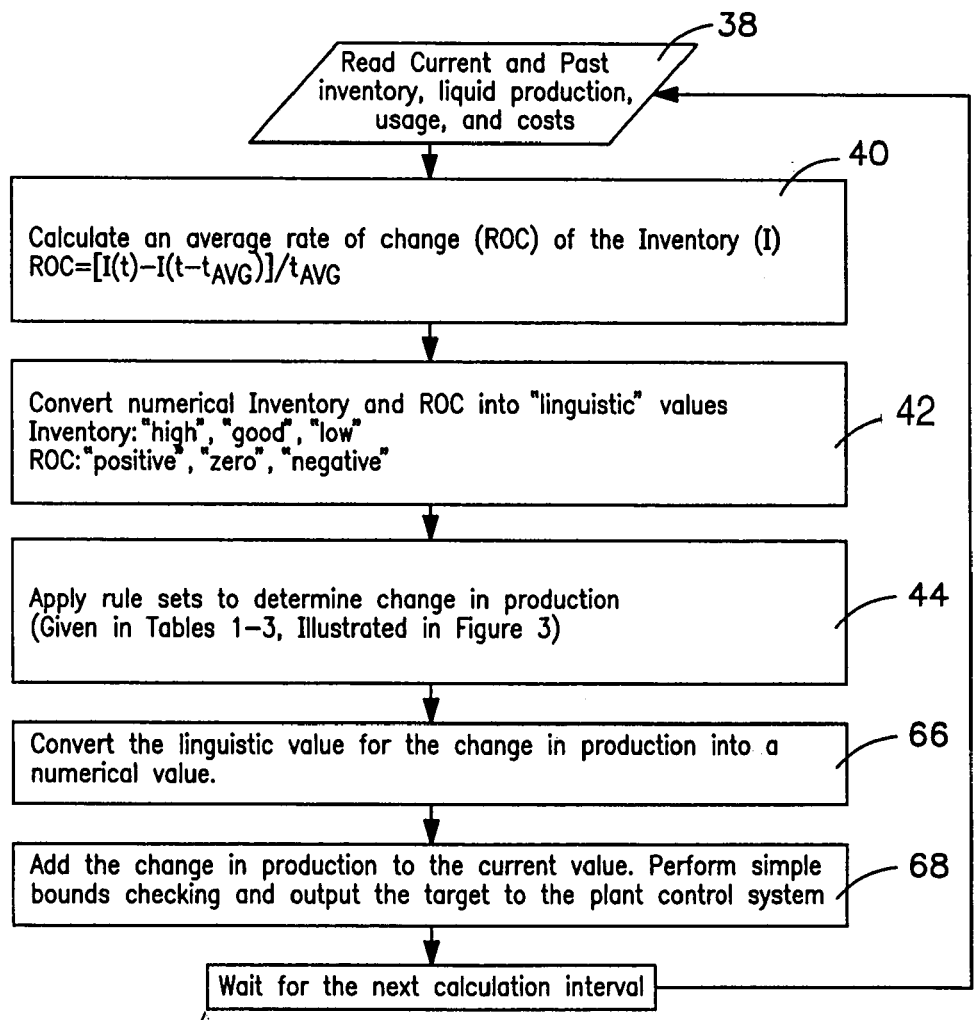
FIG. 2 is a logic flow diagram of the expert system controller illustrated in FIG. 1.

With reference to FIG. 2, data is read or alternatively inputted at 38 into expert system controller 18 and an average rate of change of liquid inventory is calculated at 40. This average is simply the difference between a past liquid inventory within liquid storage tank 14 and the current liquid inventory within liquid tank 10 divided by the calculation time interval, or in other words, the time period between execution of the programming involved in expert system controller 18. As indicated above, this time period could be a shift length which would be 12 hours. As will be discussed and as indicated at 42, the numerical values for the rate of change of liquid inventory input 30 and the current liquid inventory input 28 are fuzzified, or in other words, converted into linguistic values by graphical representations of fuzzy sets.

Figure 3:
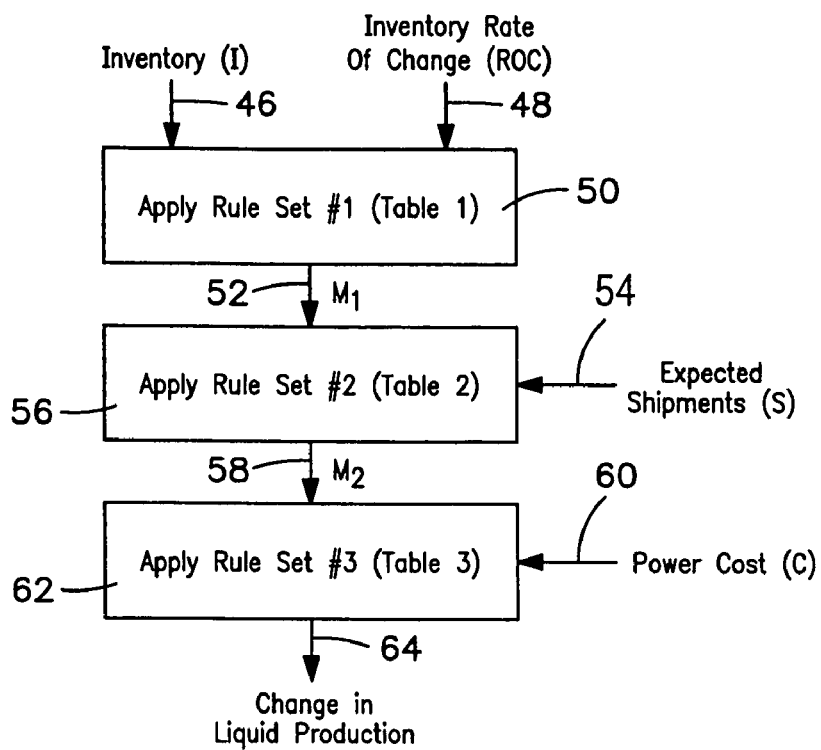
FIG. 3 is a schematic illustration of the application of rule sets to input data to obtain a new production rate for liquid over a forecast period.

With additional reference to FIG. 3, the fuzzification of the current liquid inventory input 28 and rate of change of liquid inventory input 30 produce first and second input linguistic values 46 and 48 that are applied to an applicable rule set 50 such as will be discussed with reference to Table 1 below to produce first intermediate linguistic values 52. Numerical values for projected liquid demand input 22 are then converted into third linguistic values 54 which are applied together with first intermediate linguistic values 52 to a second rule set 56 that will be discussed with reference to Table 2 below to produce second intermediate linguistic values 58. Numerical values for projected power cost 20 are then converted into fourth linguistic values 60 which together with second intermediate linguistic values 58 are applied to a rule set such as set forth in Table 3 below to obtain output linguistic values 64.

With reference again to FIG. 2, the output linguistic values 64 are then converted into an output numerical value for the differential production rate of the liquid product 12 as indicated in block 66. As indicated at 68, the numerical value for the forecasted differential production rate 64 of the liquid product 12 is then added to the current liquid production rate provided as input 24. This sum is the new production rate to be applied to plant 10 during the forecast period. At stage 69 of the execution of the expert system controller 18, the program remains dormant for the calculation time interval and then executes again as described above to determine a new production rate for a successive forecast period.

At 68 bounds checking is performed. While in most cases, the new production rate will be within the upper and lower limits of the liquid production from the air separation plant 10, it is preferred that a simple bounds check be performed to confirm that the new production rate is within such bounds of production before it is set to the control system. If the new production rate is greater than the maximum or less than the minimum, the respective bound is outputted. If the calculated values are between the minimum and maximum, the new production rate is outputted unchanged to a controller 70. Once the value is outputted to the plant information system, it can be used in one or two ways. In an open-loop situation the plant can use the output as a guideline to set the liquid production of the plant. This approach requires manual human intervention. The second way, closed-loop, the controller output goes directly to the supervisory system. The controller 70 can be either a model predictive controller "MPC" or a real time optimization program "RTO" that automatically changes the plant operations.

Although as has been discussed above, expert system controller 18 fuzzifies numerical values for projected power cost, projected liquid product demand and etc., the operator might manually convert the numerical values to linguistic values and manually input such values into the expert system controller 18.

Figure 4:
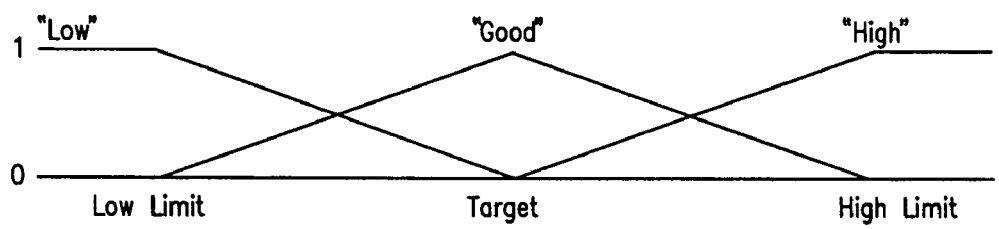
FIG. 4 is a graphical representation of a fuzzy set utilized to convert current liquid inventory to linguistic values.

By way of example and with specific reference to FIG. 4, assuming a tank size for liquid tank 14 of 60 MMSCF, fuzzy sets for the current liquid inventory (input 28) could be defined with a low limit equal to 30, a target equal to 40 and a high limit equal to 50. With respect to FIG. 5, the rate of change of the liquid inventory (input 30) would then be defined using numerical values "CN"=−2 and "CP"=+2 with the rate of change calculated using 12 hours. Each input value is described by its membership in each of these sets. For instance, if liquid inventory is currently 45 MSSCF, then with reference to FIG. 4, the resultant first linguistic values could be defined as: as 0 percent "low", 50 percent "good" and 50 percent "high". In standard notation this would be expressed as (0.5, "good") and (0.5, "high"). The same procedure would be calculated for the rate of change of liquid inventory. Assuming that the calculated rate of change of the inventory 30 is 1.5, then the second linguistic values could be expressed as follows: (0.5, "zero") and (0.5, "positive").

All sets are then applied, as indicated in block 44, to determine a forecasted differential production rate. Although one rule set could be used, practically three rule sets are used. With reference to FIG. 3, the first linguistic values 46, related to current liquid inventory of liquid tank 14 and second linguistic values 48, related to the rate of change of liquid inventory within liquid tank 14, are applied to a rule set shown below in Table 1 to obtain first intermediate linguistic values $M_1$, designated by reference number 52.

TABLE 1

| Rule | If Inventory is | If ROC of Inventory is | Then $M_1$ should be: |
|---|---|---|---|
| 1 | "High" | "Positive" | "Very Negative" |
| 2 | "High" | "Zero" | "Negative" |
| 3 | "High" | "Negative" | "Zero" |
| 4 | "Good" | "Positive" | "Negative" |
| 5 | "Good" | "Zero" | "Zero" |
| 6 | "Good" | "Negative" | "Positive" |
| 7 | "Low" | "Positive" | "Zero" |
| 8 | "Low" | "Zero" | "Positive" |
| 9 | "Low" | "Negative" | "Very Positive" |

In the example, rules 1, 2, 4 and 5 are applicable. Rule 1 states, if the inventory is "high" and rate of change in the inventory ("ROC") is "positive", the intermediate value $M_1$ is "very negative". The applicability of the rule needs to be quantified. This is accomplished by taking the rate of change of the inventory is (0.5, "zero") and (0.5, "positive"). The intersection of the two fuzzy sets "inventory is high" and "change in inventory is positive" is the minimum of their respective memberships. In this case the value is 0.5. In a similar way, rules 2, 4, and 5 are all calculated to have an applicability of 0.5. These values are then normalized to 1 for the sake of simplicity.

Once the applicable rules are determined and their degree quantified, the output from this rule set, the first intermediate linguistic value 52 ($M_1$) can be characterized. Each of the rules listed give a linguistic value for $M_1$. For instance, rule 1 states that $M_1$ should be "very negative", rules 2 and 4 state "negative" and rule 5 states "zero". The characterization of $M_1$ is simply the sum of the applicability of the rules which dictate a certain fuzzy set and then normalized so that the sum of applicability is equal to 1. In this case, $M_1$ would be (0.25, "very negative"), (0.5, "negative"), and (0.25, "zero").

Figure 5:
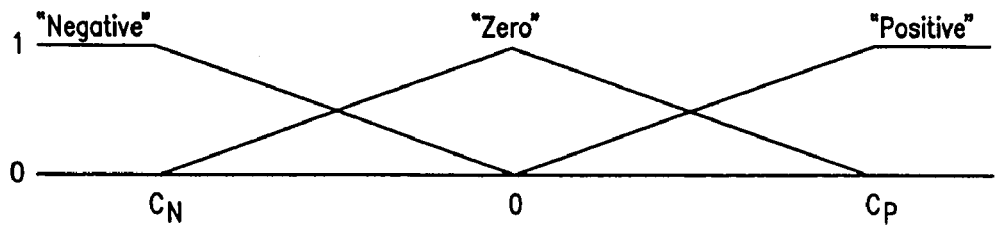
FIG. 5 is a graphical representation of a fuzzy set that is used to convert the rate of change of liquid inventory into linguistic values.
Figure 8:
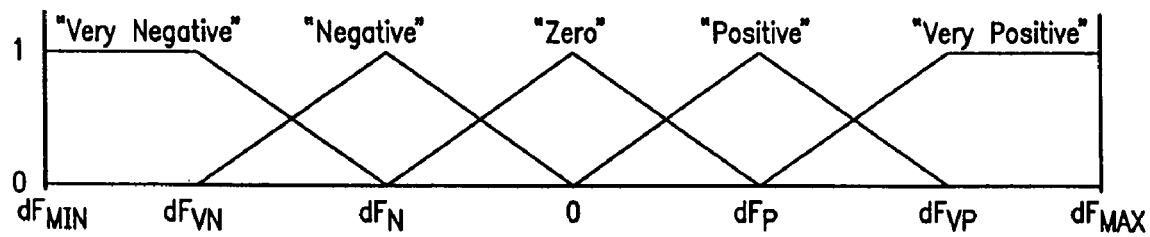
FIG. 8 is a graphical representation of a fuzzy set used to convert output linguistic values into an output numerical value of the forecasted differential production rate.

If the fuzzy sets graphically illustrated in FIGS. 4 and 5 and the rule set of Table 1 are closely inspected, what is apparent is that as the current liquid inventory (input 28) goes to the high limit and the rate of change of the liquid inventory (input 30) becomes the most positive, then the first and second linguistic values tend towards high and positive. What this means is that the linguistic values are expressing that the liquid level is tending towards high in liquid tank 14 and the liquid level 28 within liquid tank 14 is rapidly rising. When "high" and "positive" are applied to the rule set of Table 1, it can be seen that $M_1$ tends toward "negative" and "very negative". With reference to FIG. 8, these linguistic values have the effect of decreasing the forecasted differential liquid production rate 64 by making them successively more negative. Hence, in this example, or in any embodiment of the invention for that matter, it can be said that the fuzzy sets and rule sets applicable to the current liquid inventory and the rate of change of liquid inventory are selected so that increased current liquid inventory and more positive rates of change of liquid inventory tend to yield a decrease in the forecasted differential production rate.

As well known in the art of programming an expert system, the bounds and slope of lines used in the fuzzy sets 4 and 5 and the rule set of Table 1 are selected on the basis of past plant operation and common sense. Hence the fuzzy sets and rule sets will not necessarily be the same for different plants and applications of the present invention. The same holds true with respect to other fuzzy sets and rule sets discussed below.

A further point here with respect to FIG. 4 is the setting of the "low limit" and the "high limit". The "low limit" in case of a liquid only plant might be the liquid level necessary to meet ordinary demands for a given time period, for example, a shift of 12 hours. In a plant that also makes gaseous products, there is a certain amount of liquid that must always be kept on hand that is capable of being vaporized to meet gas supply contracts. In such case, the "low limit" might be set at such level or a combination of a level of liquid necessary to meet gas supply contracts and to supply liquid to meet demand patterns. The "high level" is simply a constraint on the maximum liquid inventory able to be stored in liquid tank 14.

Figure 6:
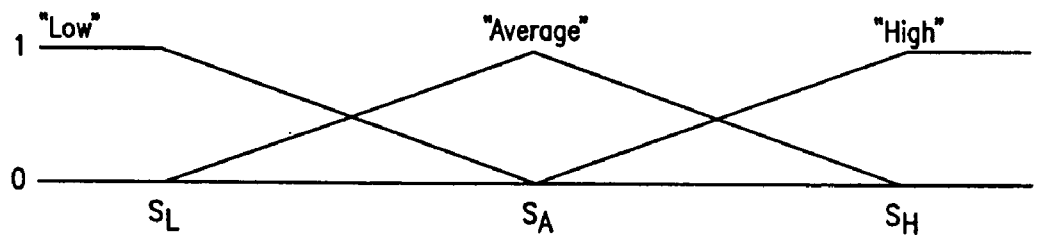
FIG. 6 is a graphical representation of a fuzzy set that is used to convert the projected demand for liquid into linguistic values.

With reference to FIG. 6, numerical values for the projected liquid demand (input 22) are converted into third linguistic values 54 and together with first intermediate linguistic values 52 are applied to a second rule set 56 given in Table 2 below. In FIG. 6, for exemplary purposes, $S_L=3$ mscf; $S_A=5$ mscf; and $S_H=7$ mscf. Assuming the projected liquid demand 22 is 5 mscf or average, then the corresponding linguistic value obtained from FIG. 6 would be (1.0, "average"). As indicated above, the result is applied to Table 2 below:

TABLE 2

| | $M_1$ | | | | |
|---|---|---|---|---|---|
| S | VP | P | Z | N | VN |
| H | VP | VP | P | Z | N |
| A | VP | P | Z | N | VN |
| L | P | Z | N | VN | VN |

In Table 2: S is projected liquid demand; VP is "very positive"; P is "positive"; Z is "zero"; N is "negative"; VN is: "very negative"; H is: "high"; A is "Average"; and L is "low".

Applying the rule set of Table 2, second intermediate linguistic values 58 are obtain as follows: (0.25 "very negative"); (0.5 "negative"); and (0.25 positive). It is to be noted that since the projected liquid demand 22 is average, the first intermediate linguistic values 52 are simply passed through as a result of the application of this rule set. A further point to be noted is that as the levels of projected liquid demand 22 tend towards high, the results tend towards "positive" which increase the forecasted differential production rate 64.

Figure 7:
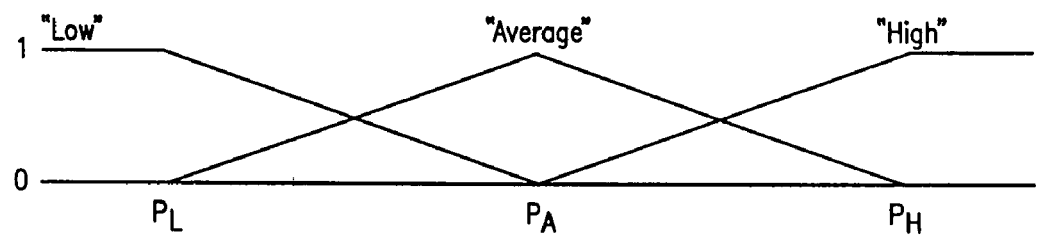
FIG. 7 is a graphical representation of a fuzzy set that is used to convert the projected unit power costs into linguistic values.

With reference to FIG. 7, the linguistic set is shown to convert projected unit power costs (input 20) to fourth linguistic values 60. In FIG. 7, again for exemplary purposes, $P_L=\$20.00/MW$; $P_A=\$35.00/MW$; and $P_H=\$50.00/MW$. The resultant linguistic values of projected unit power cost obtained from FIG. 7 and the second intermediate linguistic values 58 are applied to a third rule set given in Table 3 below:

TABLE 3

| C | VP | P | Z | N | VN |
|---|----|---|---|---|-----|
| L | VP | VP | P | Z | N |
| A | VP | P | Z | N | VN |
| H | P | Z | N | VN | VN |

(M₂ spans VP, P, Z, N, VN)

The notation used in Table 3 is the same as that used in Table 2. "C" are the fourth linguistic values 60 of the projected unit power costs. Assuming power costs are at $50.00/MW, then the fourth linguistic values are (1.0, "High"). Applying this with second intermediate linguistic values 58 to the third rule set, the output linguistic values 64 are (0.75, "very negative"); (0.25, "negative"). It is to be noted that as the projected unit power costs tends towards high, the output linguistic values tend towards "very negative", that has the effect of decreasing the differential production rate.

With reference to FIG. 8, the output linguistic values are converted back to a numerical value to obtain the forecasted differential production rate 64. In FIG. 8, for exemplary purposes, $dF_{MIN}=-30$, $dF_{VN}=-20$, $dF_N=-10$, $dF_P=10$, $dF_{VP}=20$, $dF_{MAX}=30$. The output is converted to a numerical value using the common and simple center-of-gravity approach. In that approach the center of gravity of each of the membership sets is determined. The numerical value of the output is then the sum of the centers of gravity multiplied by the membership in that set. In this example, the centers of gravity are $-10$ for "negative", and $-22.5$ for "very negative". The weighted sum of the center of gravities is calculated as: $(0.25)(-10)+(0.75)(-22.5)=-19.375$. Therefore the change in the liquid production rate should be $-19.375$ mcfh/hour and the same when added to the current liquid production rate 24 will reduce the production rate of plant 10 over the forecast time interval and as such, demand requirements will be met more from liquid tank 14 than from plant 10.

Many different types of fuzzy sets can be used to describe controller inputs and outputs. Additional types of fuzzy sets include trapezoidal and gaussian. Also there are different methods for defuzzifying the output of the controller. Other methods include center-of-large area method and middle-of-maximum method.

The controller can be applied to multiple plants which feed a common liquid inventory. In that case, the controller would be working with the total liquid production of all the plants involved. The controller calculations would not be changed in any way. The output of the controller would need to be split amongst the various production plants, either manually or through some supervisory control system that operated either as an MPC or an RTO.

While the present invention has been described with reference to a preferred embodiment, as will occur to those skilled in the art, numerous changes, additions and omissions may be made without departing from the spirit and scope of the invention.

We claim:

1. A method of controlling the production of at least one liquid product produced by at least one plant over a forecast time interval, the at least one plant having a liquid storage capacity and consuming electrical power to produce the at least one liquid product, said method comprising:

continually, upon the elapse of a calculation time interval equal to the forecast time interval:

calculating a rate of change of liquid inventory of the at least one liquid product contained with the liquid storage capacity over a past time interval equal to the calculation time interval and ending upon the calculation of the rate of change of liquid inventory;

inputting input linguistic values referable to current liquid inventory, the rate of change of liquid inventory, a current production rate of the at least one liquid product by the at least one plant, projected demand requirements for the at least one liquid product and projected unit power costs for the electrical power over the forecast time interval into an expert system controller employing fuzzy logic to apply the input linguistic values to at least one rule set to obtain output linguistic values and to convert the output linguistic values into an output numerical value of a forecasted differential production rate for the at least one liquid product;

the at least one rule set and the input linguistic values defined such that the forecasted differential production rate tends to decrease as the rate of change and/or the liquid inventory and/or the projected unit power costs increase and the differential production rate tends to increase as the projected demand requirements increase and vice-versa;

adding the output numerical value of the forecasted differential production rate to the current production rate to obtain a new production rate; and controlling the plant to produce the at least one liquid product at the new production rate during the forecast time interval.

2. The method of claim 1, wherein the at least one plant is controlled by an open-loop response.

3. The method of claim 1, wherein the at least one plant is controlled by a closed-loop response.

4. The method of claim 1, further comprising:

performing a bounds check on the new production rate to ascertain whether said new production rate is between the upper and lower bounds of production of the at least one plant;

controlling the at least one plant to produce the at least one liquid product at the new production rate during the forecast period when said new production rate is within the upper and lower bounds of production;

controlling the at least one plant to produce the at least one liquid product at the lower of the bounds of production when the new production rate is below the lower of the bounds; and controlling the at least one plant to produce the at least one liquid product at the upper of the bounds of production when the new production rate is above the upper of the bounds.

5. The method of claim 4, wherein the input of the input linguistic values into the expert system controller is accomplished, internally in the expert system controller, by inputting input data of numerical values related to the current liquid inventory, the rate of change, the projected demand requirements and the unit power costs into the expert system controller and the expert system controller converting the input numerical values into the input linguistic values.

6. The method of claim 4, wherein the at least one plant is a cryogenic air separation plant.

7. The method of claim 6, wherein the input of the input linguistic values into the expert system controller is accomplished, internally in the expert system controller, by inputting input data of numerical values related to the current liquid inventory, the rate of change, the projected demand requirements and the unit power costs into the expert system controller and the expert system controller converting the input numerical values into the input linguistic values.

8. The method of claim 7, wherein the forecasted demand requirements for the at least one liquid product are based upon customer demand patterns and any customer requests for the at least one liquid product occurring prior to the implementation of the new production rate.

9. The method of claim 8, wherein the input numerical values are converted into linguistic values and the output linguistic value is converted to the forecasted differential production rate by input and output fuzzy sets of triangular configuration and the final linguistic value is converted to the output numerical value by a center of area method.

10. The method of claim 9, wherein the at least one plant is controlled by an open-loop response.

11. The method of claim 10, wherein the at least one plant is controlled by a closed-loop response.

* * * * *